(12) United States Patent
Daniel et al.

(10) Patent No.: US 7,754,822 B2
(45) Date of Patent: Jul. 13, 2010

(54) METHOD FOR THE SECONDARY CROSSLINKING OF HYDROGELS WITH BICYCLIC AMIDE ACETALS

(75) Inventors: Thomas Daniel, Waldsee (DE); Ulrich Riegel, Landstuhl (DE); Mark Elliott, Ludwigshafen (DE); Ubbo von Oehsen, Neuluβheim (DE); Kai Michael Exner, Eppelheim (DE); Klemens Massonne, Bad Dürkheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1137 days.

(21) Appl. No.: 10/565,050

(22) PCT Filed: Jul. 7, 2004

(86) PCT No.: PCT/EP2004/007398

§ 371 (c)(1), (2), (4) Date: Feb. 15, 2006

(87) PCT Pub. No.: WO2005/019279

PCT Pub. Date: Mar. 3, 2005

(65) Prior Publication Data

US 2006/0211828 A1     Sep. 21, 2006

(30) Foreign Application Priority Data

Jul. 28, 2003 (DE) .................... 103 34 584

(51) Int. Cl.
C08F 8/32 (2006.01)

(52) U.S. Cl. .................. 525/375; 525/330.3; 525/383; 493/960

(58) Field of Classification Search ........... 525/330.3, 525/375, 383
See application file for complete search history.

(56) References Cited

U.S. PATENT DOCUMENTS

| | | | |
|---|---|---|---|
| 4,539,376 A * | 9/1985 | Goel et al. ................ | 525/375 |
| 4,666,983 A | 5/1987 | Tsubakimoto et al. | |
| 4,677,167 A | 6/1987 | Goel | |
| 4,681,926 A | 7/1987 | Goel | |
| 5,089,565 A | 2/1992 | Blum et al. | |
| 5,331,059 A | 7/1994 | Engelhardt et al. | |
| 5,385,983 A | 1/1995 | Graham | |
| 6,414,214 B1 * | 7/2002 | Engelhardt et al. .......... | 604/368 |
| 6,472,478 B1 | 10/2002 | Funk et al. | |
| 6,503,979 B1 | 1/2003 | Funk et al. | |
| 6,559,239 B1 | 5/2003 | Riegel et al. | |
| 6,657,015 B1 | 12/2003 | Riegel et al. | |
| 2004/0231605 A1 | 11/2004 | Newcomb et al. | |

FOREIGN PATENT DOCUMENTS

| | | |
|---|---|---|
| DE | 37 20 883 A1 | 1/1989 |
| DE | 198 07 992 C1 | 7/1999 |
| DE | 198 07 502 A1 | 9/1999 |
| DE | 198 54 573 A1 | 5/2000 |
| DE | 198 54 574 A1 | 5/2000 |
| EP | 0 083 022 A2 | 7/1983 |
| EP | 0 346 669 A1 | 12/1989 |
| EP | 0 530 438 A1 | 3/1993 |
| EP | 0 543 303 A1 | 5/1993 |
| JP | 06 345978 A2 | 12/1994 |
| WO | WO-03/031482 A1 | 4/2003 |

OTHER PUBLICATIONS

International Search Report in PCT/EP2004/007398 dated Dec. 10, 2004.

* cited by examiner

*Primary Examiner*—Vasu Jagannathan
*Assistant Examiner*—Robert C Boyle
(74) *Attorney, Agent, or Firm*—Marshall, Gerstein & Borun LLP

(57) ABSTRACT

A process for postcrosslinking a water-absorbing polymer comprises said polymer being treated with a postcrosslinker and, during or after said treating, being postcrosslinked and dried by temperature elevation, said postcrosslinker being a compound of the formula I

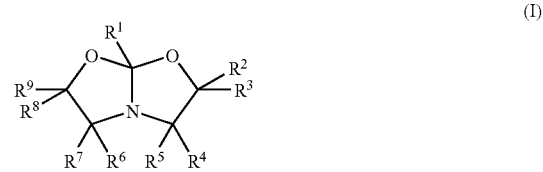

where $R^1$, $R^2$, $R^3$, $R^4$, $R^5$, $R^6$, $R^7$, $R^8$ and $R^9$ are each independently hydrogen, $C_1$-$C_{12}$-alkyl, $C_2$-$C_{12}$-alkenyl or $C_6$-$C_{12}$-aryl, wherein $C_1$-$C_{12}$-alkyl, $C_2$-$C_{12}$-alkenyl or $C_6$-$C_{12}$-aryl may be halogen substituted. The liquid-absorbing polymers are useful in hygiene articles and packaging materials.

12 Claims, No Drawings

METHOD FOR THE SECONDARY CROSSLINKING OF HYDROGELS WITH BICYCLIC AMIDE ACETALS

CROSS-REFERENCE TO RELATED APPLICATIONS

This is the U.S. national phase application of International Application No. PCT/EP2004/007398, filed Jul. 7, 2004, which claims the benefit of German patent application No. 103 34 584.1, filed Jul. 28, 2003.

The present invention relates to a process for postcrosslinking water-absorbing hydrogels with bicyclic amide acetals, to the polymers thus obtainable and to their use in hygiene articles and packaging materials.

Postcrosslinking is to be understood as referring to the gel or surface postcrosslinking of water-absorbing hydrogels.

Hydrophilic, highly swellable hydrogels are in particular polymers of (co)polymerized hydrophilic monomers, graft copolymers of one or more hydrophilic monomers on a suitable grafting base, crosslinked cellulose ethers, crosslinked starch ethers, crosslinked carboxymethylcellulose, partially crosslinked polyalkylene oxide or natural products which are swellable in aqueous fluids, such as guar derivatives for example. Such hydrogels are used as products capable of absorbing aqueous solutions to manufacture diapers, tampons, sanitary napkins and other hygiene articles, but also as water retainers in market gardening.

Hydrophilic, highly swellable hydrogels are hydrogels having a CRC value [g/g] of preferably above 15, especially above 20, more preferably above 25, especially above 30, even more preferably above 35. The CRC value [g/g] of the inventive crosslinked swellable hydrogel-forming polymers can be measured by the methods indicated in the description part.

To improve performance properties, for example diaper rewet and absorbency under load (AUL), hydrophilic, highly swellable hydrogels are generally surface or gel postcrosslinked. This postcrosslinking is preferably carried out in the aqueous gel phase or as surface postcrosslinking of the ground and classified polymeric particles.

Useful crosslinkers for this purpose are compounds which contain at least two groups capable of forming covalent bonds with the carboxyl groups of the hydrophilic polymer. Examples of suitable compounds are di- or polyglycidyl compounds, such as diglycidyl phosphonates, alkoxysilyl compounds, polyaziridines, polyamines and polyamidoamines, and these compounds can also be used in mixtures with each other (see for example EP-A-0 083 022, EP-A-0 543 303 and EP-A-0 530 438).

A significant disadvantage of these crosslinkers is their high reactivity, since it necessitates particular precautions in the manufacturing operation to avoid undesirable side effects. Moreover, the aforementioned crosslinkers have skin-irritating properties, which makes their use in hygiene articles appear problematical.

Known crosslinkers also include polyfunctional alcohols. For instance, U.S. Pat. No. 4,666,983 and also U.S. Pat. No. 5,385,983 teach the use of hydrophilic polyalcohols and the use of polyhydroxy surfactants respectively. The reaction in these references is carried out at high temperatures in the range from 120 to 250° C. The process has the disadvantage that the esterification reaction which leads to crosslinking is very slow even at these temperatures.

Furthermore, compounds described as suitable crosslinkers include 2-oxazolidone and its derivatives in DE-A-198 07 502 2, morpholine-2,3-dione and its derivatives in WO-A-03/031482, 2-oxotetrahydro-1,3-oxazine and its derivatives in DE-A-198 54 573, N-acyl-2-oxazolidones in DE-A-198 54 574 and bis- and poly-2-oxazolidinones in DE-A-198 07 992. True, these compounds meet requirements with regard to use in hygiene articles, but they are not commercially available and are relatively difficult to prepare in pure form.

Moreover, U.S. Pat. No. 6,239,230 describes β-hydroxyalkylamides as useful crosslinkers. They are indeed highly suitable for use in hygiene articles. Their disadvantage is the relatively high use levels needed and the associated costs.

It is an object of the present invention to provide gel or surface postcrosslinking equivalent to or superior to the prior art by using compounds which are relatively inert but which are nonetheless capable of reacting with carboxyl groups. This object is to be achieved with a very short reaction time and a very low reaction temperature. More particularly, it is an object of the present invention to find compounds which provide gel or surface postcrosslinking equivalent to or superior than DE-A-198 54 573 and DE-A-198 54 574 at very low use levels.

We have found that this object is achieved, surprisingly, by bicyclic amide acetals.

The present invention accordingly provides a process for postcrosslinking a water-absorbing polymer, which process comprises said polymer being treated with a postcrosslinker and, during or after said treating, being postcrosslinked and dried by temperature elevation, said postcrosslinker being a bicyclic amide acetal of the formula I

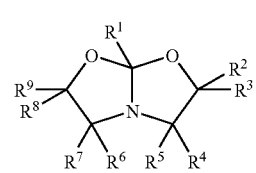

where $R^1$, $R^2$, $R^3$, $R^4$, $R^5$, $R^6$, $R^7$, $R^8$ and $R^9$ are each independently hydrogen, $C_1$-$C_{12}$-alkyl, $C_2$-$C_{12}$-alkenyl or $C_6$-$C_{12}$-aryl, wherein $C_1$-$C_{12}$-alkyl, $C_2$-$C_{12}$-alkenyl or $C_6$-$C_{12}$-aryl may be halogen substituted.

$C_3$-$C_{12}$-Alkyl, $C_3$-$C_{12}$-alkenyl or $C_8$-$C_{12}$-aryl may be branched or unbranched and halogen is fluorine, chlorine, bromine and/or iodine.

Preference is given to amide acetals of the formula I where $R^1$ is as defined above and $R^2$, $R^3$, $R^4$, $R^5$, $R^6$, $R^7$, $R^8$ and $R^9$ are each independently hydrogen, $C_1$-$C_6$-alkyl, $C_2$-$C_6$-alkenyl or $C_6$-$C_7$-aryl, wherein $C_1$-$C_6$-alkyl, $C_2$-$C_6$-alkenyl or $C_6$-$C_7$-aryl may be halogen substituted.

$C_3$-$C_6$-Alkyl or $C_3$-$C_6$-alkenyl may be branched or unbranched and halogen is fluorine and/or chlorine.

Particular preference is given to amide acetals of the formula I where $R^1$ is $C_1$-$C_6$-alkyl, $C_2$-$C_6$-alkenyl or $C_6$-$C_7$-aryl, or $R^2$, $R^4$, $R^6$ and $R^8$ are each independently hydrogen and $R^3$, $R^5$, $R^7$ and $R^9$ are each independently hydrogen, $C_1$-$C_4$-alkyl or $C_2$-$C_4$-alkenyl, wherein $C_1$-$C_4$-alkyl or $C_2$-$C_4$-alkenyl may be fluorine substituted.

$C_3$-$C_4$-Alkyl or $C_3$-$C_4$-alkenyl may be branched or unbranched.

Most preference is given to 1-aza-4,6-dioxabicyclo[3.3.0]octane.

$R^1$ radicals which are most preferred are hydrogen, methyl, ethyl, propyl, prop-2-yl (isopropyl), butyl, but-2-yl (isobutyl), pentyl, pent-2-yl, pent-3-yl, 2-methylpentyl, 3-methylpentyl, 3-methylpent-2-yl, 2,2-dimethylpropyl, trifluoromethyl, ethenyl, propen-2-yl, buten-2-yl, phenyl, 2-methylphenyl, 3-methylphenyl and 4-methylphenyl.

$R^3$, $R^5$, $R^7$ and $R^9$ radicals which are most preferred are hydrogen, methyl, ethyl, propyl, prop-2-yl (isopropyl), butyl, but-2-yl (isobutyl) and trifluoromethyl.

The bicyclic amide acetals may be prepared for example by reaction of dialkanolamines with dimethylformamide dimethyl acetal, as described by Z. Arnold and M. Kornilov in Coll. Czechoslov. Chem. Commun., 1964, volume 29, pages 645 to 651, or by reaction of dialkanolamines with carbonitriles, as described by K. Burzin and F. Feinauer in Angew. Chem., 1973, volume 85, pages 1055 to 1056.

The bicyclic amide acetal can be used as a substance or as a solution. The use as a solution in an inert solvent is preferred. Furthermore, the postcrosslinker may be added to the polymerizing monomer solution, to the polymer gel before drying or to the dried polymer gel. The addition to the dried polymer gel is preferred.

The postcrosslinking solution is preferably applied by spraying it onto the polymer in suitable spray mixers. Following spray application, the polymer powder is thermally dried, and the crosslinking reaction can take place not only before but also during drying. Preference is given to a spray application of a solution of the crosslinker in reaction mixers or mixing and drying systems such as for example Lödige mixers, BEPEX® mixers, NAUTA® mixers, SHUGGI® mixers or PROCESSALL®. Moreover, fluidized bed dryers can also be used. The postcrosslinking and drying temperature range extends preferably from 30 to 200° C., especially from 80 to 180° C. and more preferably from 120 to 170° C.

Drying may take place in the mixer itself, by heating the outer casing or by blowing hot air in. It is similarly possible to use a downstream dryer such as a tray dryer, a rotary tube dryer or a heatable screw. But it is also possible, for example, to use an azeotropic distillation as a drying process. The preferred residence time at this temperature in the reaction mixer or dryer is less than 120 minutes and more preferably less than 90 minutes.

The postcrosslinker is dissolved in inert solvents. The postcrosslinker is used in an amount from 0.01% to 5% by weight, preferably from 0.01% to 1.0% by weight and more preferably from 0.05% to 0.5% by weight, based on the polymer used. The inert solvent is preferably water or a mixture of water with mono- or polyhydric alcohols, for example monohydric, dihydric and trihydric alcohols. However, it is also possible to use any infinitely water-miscible organic solvent which is not itself reactive under the process conditions. When an alcohol-water mixture is used, the alcohol content of this solution is for example in the range from 10% to 90% by weight, preferably in the range from 15% to 70% by weight and especially in the range from 20% to 60% by weight. Any alcohol of infinite miscibility with water may be used, as may mixtures of two or more alcohols (for example methanol+glycerol+water). The alcohol mixtures may contain the alcohols in any desired mixing ratio. However, it is particularly preferable to use the following alcohols in aqueous solution: methanol, ethanol, ethylene glycol and more preferably isopropanol, 1,2-propanediol and also 1,3-propanediol.

It will be appreciated that the postcrosslinker can be used as a nonaqueous solution. In this case, the dried hydrogel is moistened with water before, during or after spraying with the postcrosslinker solution.

In a further preferred embodiment of the invention, the postcrosslinker solution is used in a ratio in the range from 0.5% to 20% by weight, based on the mass of the polymer. Particular preference is given to a solution quantity in the range from 1% to 10% by weight, based on the polymer.

The postcrosslinkers of the present invention may be used alone or combined with other postcrosslinkers, for example ethylene glycol diglycidyl ether, diethylene glycol diglycidyl ether, polyethylene glycol diglycidyl ether, propylene glycol diglycidyl ether, dipropylene glycol diglycidyl ether, polypropylene glycol diglycidyl ether, glycerol diglycidyl ether, polyglycerol diglycidyl ether, epichlorohydrin, ethylenediamine, ethylene glycol, diethylene glycol, triethylene glycol, polyethylene glycol, propylene glycol, dipropylene glycol, tripropylene glycol, polypropylene glycol, butylene glycol, 1,3-propanediol, 1,4-butanediol, bisphenol A, glycerol, trimethylolpropane, pentaerythritol, sorbitol, diethanolamine, triethanolamine, ethylenediamine.

The present invention further provides crosslinked water-absorbing polymers, which are obtainable by the process of the present invention.

The hydrophilic, highly swellable hydrogels to be used in the process of the present invention are in particular polymers of crosslinked (co)polymerized hydrophilic monomers, polyaspartic acid, graft copolymers of one or more hydrophilic monomers on a suitable grafting base, crosslinked cellulose ethers, crosslinked starch ethers or natural products which are swellable in aqueous fluids, such as guar derivatives for example. Preferably the polymer to be crosslinked is a polymer which contains structural units which are derived from acrylic acid or acrylic esters or which were obtained by graft copolymerization of acrylic acid or acrylic esters onto a water-soluble polymeric matrix. These hydrogels are known to one skilled in the art and are described for example in U.S. Pat. No. 4,286,082, DE-C-27 06 135, U.S. Pat. No. 4,340, 706, DE-C-37 13 601, DE-C-28 40 010, DE-A-43 44 548, DE-A40 20 780, DE-A-40 15 085, DE-A-39 17 846, DE-A-38 07 289, DE-A-35 33 337, DE-A-35 03 458, DE-A42 44 548, DE-A-42 19 607, DE-A-40 21 847, DE-A-38 31 261, DE-A-35 11 086, DE-A-31 18 172, DE-A-30 28 043, DE-A-44 18 881, EP-A-0 801 483, EP-A-0 455 985, EP-A-0 467 073, EP-A-0 312 952, EP-A-0 205 874, EP-A-0 499 774, DE-A 26 12 846, DE-A-40 20 780, EP-A-0 205 674, U.S. Pat. No. 5,145,906, EP-A-0 530 438, EP-A-0 670 073, U.S. Pat. No. 4,057,521, U.S. Pat. No. 4,062,817, U.S. Pat. No. 4,525, 527, U.S. Pat. No. 4,295,987, U.S. Pat. No. 5,011,892, U.S. Pat. No. 4,076,663 or U.S. Pat. No. 4,931,497. The content of the aforementioned patent documents is hereby expressly incorporated herein by reference.

Examples of hydrophilic monomers useful for preparing these hydrophilic, highly swellable hydrogels are polymerization-capable acids, such as acrylic acid, methacrylic acid, vinylsulfonic acid, vinylphosphonic acid, maleic acid including its anhydride, fumaric acid, itaconic acid, 2-acrylamido-2-methylpropanesulfonic acid, 2-acrylamido-2-methylpropanephosphonic acid and also their amides, hydroxyalkyl esters and amino- or ammonio-containing esters and amides and also the alkali metal and/or ammonium salts of the acid-functional monomers. Also suitable are water-soluble N-vinylamides such as N-vinylformamide or else diallyldimethylammonium chloride. Preferred hydrophilic monomers are compounds of the general formula II

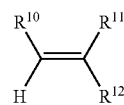

(II)

where $R^{10}$ is hydrogen, methyl, ethyl or carboxyl, $R^{11}$ is —COOR$^{13}$, hydroxysulfonyl or phosphonyl, a $C_1$-$C_4$-alkanol-esterified phosphonyl group or a group of the formula III

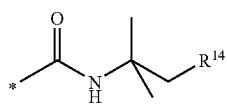

$R^{12}$ is hydrogen, methyl or ethyl, $R^{13}$ is hydrogen, $C_1$-$C_4$-aminoalkyl, $C_1$-$C_4$-hydroxyalkyl, alkali metal ion or ammonium ion, and $R^{14}$ is a sulfonyl group, a phosphonyl group or a carboxyl group or an alkali metal or ammonium salt of each of these.

Examples of $C_1$-$C_4$-alkanols are methanol, ethanol, n-propanol, isopropanol or n-butanol.

Particularly preferred hydrophilic monomers are acrylic acid and methacrylic acid and also their alkali metal or ammonium salts, for example sodium acrylate, potassium acrylate or ammonium acrylate.

Suitable grafting bases for hydrophilic hydrogels obtainable via graft copolymerization of olefinically unsaturated acids or their alkali metal or ammonium salts may be of natural or synthetic origin. Examples are starch, cellulose or cellulose derivatives and also other polysaccharides and oligosaccharides, polyalkylene oxides, in particular polyethylene oxides and polypropylene oxides, and also hydrophilic polyesters.

Suitable polyalkylene oxides have for example the formula IV

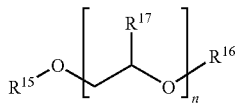

where $R^{15}$ and $R^{16}$ are each independently hydrogen, alkyl, alkenyl or aryl, $R^{17}$ is hydrogen or methyl, and n is an integer from 1 to 500.

$R^{15}$ and $R^{16}$ are each preferably hydrogen, $C_1$-$C_4$-alkyl, $C_2$-$C_6$-alkenyl or phenyl.

Preferred hydrogels are in particular polyacrylates, polymethacrylates and also the graft polymers described in U.S. Pat. No. 4,931,497, U.S. Pat. No. 5,011,892 and U.S. Pat. No. 5,041,496.

The hydrophilic, highly swellable hydrogels are preferably in crosslinked form; that is, they include compounds having at least two double bonds which have been copolymerized into the polymer network. Suitable crosslinkers are in particular N,N'-methylenebisacrylamide and N,N'-methylenebismethacrylamide, esters of unsaturated mono- or polycarboxylic acids of polyols, such as diacrylate or triacrylate, examples being the diacrylates and dimethacrylates of butanediol and ethylene and also trimethylolpropane triacrylate and allyl compounds such as allyl (meth)acrylate, triallyl cyanurate, diallyl maleate, polyallyl esters, tetraallyloxyethane, triallylamine, tetraallylethylenediamine, allyl esters of phosphoric acid and also vinylphosphonic acid derivatives as described for example in EPA 0 343 427. The process of the present invention may further utilize hydrogels which are prepared using polyallyl ethers as crosslinkers and by acidic homopolymerization of acrylic acid. Suitable crosslinkers are pentaerythritol triallyl ether, pentaerythritol tetraallyl ether, polyethylene glycol diallyl ether, monoethylene glycol diallyl ether, glycerol diallyl ether, glycerol triallyl ether, polyallyl ethers based on sorbitol, and also ethoxylated variants thereof.

The preferred methods of making the base polymer which can be used in the process of the present invention are described in "Modern Superabsorbent Polymer Technology", F. L. Buchholz and A. T. Graham, Wiley-VCH, 1998, pages 77 to 84. Particular preference is given to base polymers which are produced in a kneader as described for example in WO-A-01/38402 or on a belt reactor as described for example in EP-A-0 955 086.

The water-absorbing polymer is preferably a polymeric acrylic acid or a polyacrylate. This water-absorbing polymer may be prepared according to a literature method. Preference is given to polymers which contain crosslinking comonomers in amounts from 0.001 to 10 mol % and preferably from 0.01 to 1 mol %, but most preference is given to polymers which were obtained by free-radical polymerization using a polyfunctional ethylenically unsaturated free-radical crosslinker which additionally bears at least one free hydroxyl group (such as for example pentaerythritol triallyl ether or trimethylolpropane diallyl ether).

The hydrophilic, high swellable hydrogels are preparable by conventional polymerization processes. Preference is given to addition polymerization in aqueous solution by the process known as gel polymerization. In this process from 15 to 50% by weight aqueous solutions of one or more hydrophilic monomers and optionally of a suitable grafting base are polymerized in the presence of a free-radical initiator, preferably without mechanical mixing, by utilizing the Trommsdorff-Norrish effect (Makromol. Chem. 1, 169 (1947)). The addition polymerization reaction may be carried out in the temperature range between 0 and 150° C. and preferably between 10 and 100° C., not only at atmospheric pressure but also at elevated or reduced pressure. As customary, the addition polymerization may also be carried out in a protective gas atmosphere, preferably under nitrogen. The addition polymerization may be initiated using high-energy electromagnetic radiation or the customary chemical addition polymerization initiators, for example organic peroxides, such as benzoyl peroxide, tert-butyl hydroperoxide, methyl ethyl ketone peroxide, cumene hydroperoxide, azo compounds such as azodiisobutyronitrile and also inorganic peroxo compounds such as $(NH_4)_2S_2O_8$.$K_2S_2O_8$ or $H_2O_2$. They may if desired be used in combination with reducing agents such as sodium bisulfite and iron(II) sulfate or redox systems where the reducing component is an aliphatic and aromatic sulfinic acid, such benzenesulfinic acid and toluenesulfinic acid or derivatives thereof, such as Mannich adducts of sulfinic acids, aldehydes and amino compounds as described in DE-A-13 01 566. The performance properties of the polymers may be further improved by postheating the polymer gels for a number of hours in the temperature range from 50 to 130° C. and preferably from 70 to 100° C.

The gels obtained are neutralized, for example to 0-100 mol %, preferably 25-100 mol % and more preferably to 50-85 mol %, based on monomer used, for which the customary neutralizing agents can be used, preferably alkali metal hydroxides or oxides, but particularly preferably sodium hydroxide, sodium carbonate or sodium bicarbonate.

Neutralization is customarily effected by mixing in the neutralizing agent as an aqueous solution or preferably as a solid. For this purpose the gel is mechanically comminuted, by means of a meat grinder for example, and the neutralizing agent is sprayed on, scattered over or poured on and then carefully mixed in. To effect homogenization, the resultant gel mass may be passed through the meat grinder again a number of times. The neutralized gel mass is then dried with a belt dryer or roller dryer until the residual moisture content is less than 10% by weight and especially less than 5% by weight. The dried hydrogel is then ground and sieved, the customary grinding apparatus being roll mills, pin mills or swing mills. The particle size of the sieved hydrogel is preferably in the range from 45 to 1 000 μm, more preferably in the range from 45 to 850 μm, even more preferably in the range from 100 to 800 μm and most preferably in the range from 100 to 700 μm.

The AUL 0.7 psi value [g/g] of the inventive postcrosslinked water-absorbing polymers can be measured by the methods indicated in the description part and is preferably above 10, especially above 15, more preferably above 20, especially above 25 and even more preferably above 30.

To ascertain the quality of surface postcrosslinking, the dried hydrogel is tested using the test methods described hereinbelow:

Methods:

Centrifuge Retention Capacity (CRC)

This method measures the free swellability of the hydrogel in a tea bag. 0.2000±0.0050 g of dry hydrogel (particle size fraction 106-850 μm) is weighed into a 60×85 mm tea bag, which is subsequently sealed. The tea bag is placed in an excess of 0.9% by weight sodium chloride solution (at least 0.83 l of sodium chloride solution/1 g of polymeric powder) for 30 minutes. Afterwards, the tea bag is centrifuged at 250 G for 3 minutes. The amount of liquid retained by the hydrogel is determined by reweighing the centrifuged tea bag.

Absorbency Under Load (AUL) 0.5/0.7 psi (3450/4830 Pa)

The measuring cell for determining AUL 0.5/0.7 psi is a Plexiglas cylinder (50 mm in height and 60 mm in internal diameter) whose base is formed by adhering a screen of stainless steel mesh (mesh size 36 μm). The measuring cell further includes a plastic plate 59 mm in diameter and a weight which can be placed into the measuring cell together with the plastic plate. The combined weight of plastic plate and the weight is 960 g and 1 344 g respectively. To determine AUL 0.5/0.7 psi, the weight of the empty Plexiglas cylinder and of the plastic plate is determined and recorded as $W_0$. Then 0.900±0.005 g of hydrogel-forming polymer (particle size distribution 150-800 μm) is weighed into the Plexiglas cylinder and distributed very uniformly over the stainless steel screen bottom. Then the plastic plate is carefully placed into the Plexiglas cylinder and the whole unit is weighed; the weight is recorded as $W_a$. Then the weight is placed onto the plastic plate in the Plexiglas cylinder. A ceramic filter plate 120 mm in diameter, 10 mm in height and 0 in porosity is then placed in the middle of a Petri dish 200 mm in diameter and 30 mm in height and sufficient 0.9% by weight sodium chloride solution is introduced for the surface of the liquid to be level with the filter plate surface without the surface of the filter plate being wetted. A round filter paper 90 mm in diameter and <20 μm in pore size (S&S 589 Schwarzband from Schleicher & Schull) is subsequently placed on the ceramic plate.

The Plexiglas cylinder containing hydrogel-forming polymer is then placed with plastic plate and weight on top of the filter paper and left there for 60 minutes. At the end of this period, the complete unit is removed from the filter paper and the Petri dish and subsequently the weight is removed from the Plexiglas cylinder. The Plexiglas cylinder containing swollen hydrogel is weighed together with the plastic plate and the weight recorded as $W_b$.

AUL is calculated as follows:

$$\text{AUL } 0.5/0.7 \text{ psi } [g/g] = [W_b - W_a]/[W_a - W_0]$$

EXAMPLES

Example 1

A Lödige VT 5R-MK plowshare kneader (5 l volume) is charged with 388 g of deionized water, 173.5 g of acrylic acid, 2033.2 g of a 37.3% by weight sodium acrylate solution (100 mol % neutralized) and also 4.50 g of ethoxylated (15 EO) trimethylolpropane triacrylate (Sartomer® SR 9035, from Sartomer). This initial charge is inertized by having nitrogen bubble through it for 20 minutes. Dilute aqueous solutions of 2.112 g of sodium persulfate, 0.045 g of ascorbic acid and also 0.126 g of hydrogen peroxide are added to start the reaction at about 23° C. After the reaction has been started, the temperature of the heating jacket is controlled to the reaction temperature in the reactor. The crumbly gel eventually obtained is then dried in a through-circulation cabinet at 160° C. for about 3 h. This is followed by grinding and classifying to 250-850 micrometers. The hydrogel obtained is thereafter surface postcrosslinked. The AUL 0.3 psi value of the base polymer is 17 g/g and the water content is 2.7% by weight.

Examples 2 to 36

Base polymer as per example 1 is sprayed with crosslinker solution in a Waring laboratory mixer. The composition of the solution is such that the following dosage is achieved, based on base polymer used: 0.10% by weight of bicyclic amide acetal, 1.5% by weight of isopropanol or 1,2-propanediol and 3.5% by weight of water. The moist polymer is then dried for 60 minutes at the stated temperature.

Crosslinker 1: 5-methyl-1-aza-4,6-dioxabicyclo[3.3.0]octane

Crosslinker 2: 1-aza-4,6-dioxabicyclo[3.3.0]octane

Crosslinker 3: 5-isopropyl-1-aza-4,6-dioxabicyclo[3.3.0]octane

Crosslinker 4: 5-butyl-1-aza-4,6-dioxabicyclo[3.3.0]octane

Crosslinker 5: 5-butyl-1-aza-3,7-dimethyl-4,6-dioxabicyclo[3.3.0]octane

Crosslinker 6: 5-propyl-1-aza-3,7-dimethyl-4,6-dioxabicyclo[3.3.0]octane

Crosslinker 7: 5-isopropyl-1-aza-3,7-dimethyl-4,6-dioxabicyclo[3.3.0]octane

Crosslinker 8: 5-ethyl-1-aza-4,6-dioxabicyclo[3.3.0]octane

Crosslinker 9: 5-ethyl-1-aza-3,7-dimethyl-4,6-dioxabicyclo[3.3.0]octane

Crosslinker 10: 5-propyl-1-aza-4,6-dioxabicyclo[3.3.0]octane

Crosslinker 11: 5-trifluoromethyl-1-aza-4,6-dioxabicyclo[3.3.0]octane

The polymers prepared as per the above examples were tested and the results are summarized below in table 1:

TABLE 1

| | Drying temperature | Crosslinker | Solvent | CRC (g/g) | AUL 0.5 psi (g/g) | AUL 0.7 psi g/g |
|---|---|---|---|---|---|---|
| Example 1 Base polymer | — | — | — | 37.0 | | |
| Example 2 | 150° C. | Crosslinker 1 | Isopropanol/water | 37.0 | 14.2 | 9.5 |
| Example 3 | 175° C. | Crosslinker 1 | Isopropanol/water | 32.1 | 27.3 | 24.2 |
| Example 4 | 150° C. | Crosslinker 1 | 1,2-Propanediol/water | 31.6 | 24.9 | 22.2 |
| Example 5 | 160° C. | Crosslinker 1 | Isopropanol/water | 33.7 | 25.4 | 22.1 |
| Example 6 | 150° C. | Crosslinker 2 | Isopropanol/water | 38.1 | 8.6 | 7.8 |
| Example 7 | 175° C. | Crosslinker 2 | Isopropanol/water | 34.1 | 28.2 | 24.7 |
| Example 8 | 150° C. | Crosslinker 2 | 1,2-Propanediol/water | 35.9 | 22.3 | 16.0 |
| Example 9 | 160° C. | Crosslinker 2 | Isopropanol/water | 35.4 | 25.5 | 21.0 |
| Example 10 | 150° C. | Crosslinker 3 | Isopropanol/water | 37.4 | 16.1 | 10.5 |
| Example 11 | 175° C. | Crosslinker 3 | Isopropanol/water | 31.8 | 26.0 | 23.4 |
| Example 12 | 150° C. | Crosslinker 3 | 1,2-Propanediol/water | 29.8 | 25.1 | 22.1 |
| Example 13 | 150° C. | Crosslinker 4 | Isopropanol/water | 38.3 | 10.2 | 8.0 |
| Example 14 | 175° C. | Crosslinker 4 | Isopropanol/water | 34.3 | 27.9 | 23.8 |
| Example 15 | 150° C. | Crosslinker 4 | 1,2-Propanediol/water | 30.8 | 26.2 | 23.5 |
| Example 16 | 150° C. | Crosslinker 5 | Isopropanol/water | 38.2 | 8.3 | 7.4 |
| Example 17 | 175° C. | Crosslinker 5 | Isopropanol/water | 38.2 | 26.0 | 10.2 |
| Example 18 | 150° C. | Crosslinker 5 | 1,2-Propanediol/water | 35.0 | 22.2 | 15.7 |
| Example 19 | 150° C. | Crosslinker 6 | Isopropanol/water | 38.1 | 8.5 | 7.5 |
| Example 20 | 175° C. | Crosslinker 6 | Isopropanol/water | 37.1 | 17.0 | 11.7 |
| Example 21 | 150° C. | Crosslinker 6 | 1,2-Propanediol/water | 34.6 | 25.4 | 19.9 |
| Example 22 | 150° C. | Crosslinker 7 | Isopropanol/water | 38.6 | 9.6 | 7.5 |
| Example 23 | 175° C. | Crosslinker 7 | Isopropanol/water | 37.8 | 18.1 | 12.8 |
| Example 24 | 150° C. | Crosslinker 7 | 1,2-Propanediol/water | 33.3 | 25.7 | 21.5 |
| Example 25 | 150° C. | Crosslinker 8 | Isopropanol/water | 36.6 | 21.7 | 14.5 |
| Example 26 | 175° C. | Crosslinker 8 | Isopropanol/water | 31.3 | 24.6 | 21.5 |
| Example 27 | 150° C. | Crosslinker 8 | 1,2-Propanediol/water | 30.0 | 24.0 | 21.2 |
| Example 28 | 150° C. | Crosslinker 9 | Isopropanol/water | 38.2 | 8.9 | 7.8 |
| Example 29 | 175° C. | Crosslinker 9 | Isopropanol/water | 36.7 | 23.3 | 17.1 |
| Example 30 | 150° C. | Crosslinker 9 | 1,2-Propanediol/water | 33.9 | 26.6 | 22.3 |
| Example 31 | 150° C. | Crosslinker 10 | Isopropanol/water | 37.4 | 13.1 | 9.0 |
| Example 32 | 175° C. | Crosslinker 10 | Isopropanol/water | 33.3 | 26.4 | 24.1 |
| Example 33 | 150° C. | Crosslinker 10 | 1,2-Propanediol/water | 31.5 | 25.6 | 22.8 |
| Example 34 | 150° C. | Crosslinker 11 | Isopropanol/water | 38.0 | 8.4 | 7.7 |
| Example 35 | 175° C. | Crosslinker 11 | Isopropanol/water | 37.8 | 17.7 | 12.3 |
| Example 36 | 150° C. | Crosslinker 11 | 1,2-Propanediol/water | 35.7 | 12.9 | 9.0 |

We claim:

1. A process for postcrosslinking a water-absorbing polymer, which process comprises treating said polymer with a postcrosslinker and, during or after said treating, postcrosslinking and drying by temperature elevation, said postcrosslinker being a compound of a formula (I)

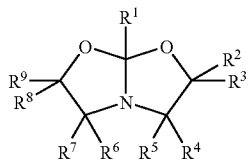

(I)

wherein $R^1$, $R^2$, $R^3$, $R^4$, $R^5$, $R^6$, $R^7$, $R^8$, and $R^9$ are each independently hydrogen, $C_1$-$C_{12}$-alkyl, $C_2$-$C_{12}$-alkenyl, or $C_6$-$C_{12}$-aryl, wherein $C_1$-$C_{12}$-alkyl, $C_2$-$C_{12}$-alkenyl, or $C_6$-$C_{12}$-aryl may be halogen substituted.

2. The process of claim 1 wherein said postcrosslinker is of the formula (I) wherein $R^1$ is $C_1$-$C_6$-alkyl, $C_2$-$C_6$-alkenyl, or $C_6$-$C_7$-aryl, $R^2$, $R^4$, $R^6$, and $R^8$ are each independently hydrogen, and $R^3$, $R^5$, $R^7$, and $R^9$ are each independently hydrogen, $C_1$-$C_4$-alkyl, or $C_2$-$C_4$-alkenyl, wherein $C_1$-$C_4$-alkyl or $C_2$-$C_4$-alkenyl may be fluorine substituted.

3. The process of claim 1 wherein said postcrosslinker is 1-aza-4,6-dioxabicyclo[3.3.0]octane.

4. The process of claim 1 wherein said polymer to be postcrosslinked (a) contains structural units derived from acrylic acid or acrylic esters or (b) is obtained by graft copolymerization of acrylic acid or acrylic esters onto a water-soluble polymeric matrix.

5. The process of claim 1 wherein said postcrosslinker is a surface postcrosslinker which is used as a solution in an inert solvent.

6. The process of claim 5 wherein said inert solvent comprises an aqueous solution of glycerol, methanol, ethanol, isopropanol, ethylene glycol, 1,2-propanediol, 1,3-propanediol, or mixtures thereof.

7. The process of claim 5 wherein said inert solvent is water or a mixture of water with a mono- or a polyfunctional alcohol which has an alcohol content in the range from 10% to 90% by weight.

8. The process of claim 1 wherein said postcrosslinker is used in an amount from 0.01% to 5% by weight, based on the weight of said polymer.

9. A water-absorbing polymer prepared by the process of claim 1.

10. A water-absorbing polymer of claim 8 characterized by an absorbency under load (AUL) at 0.7 psi (4830 Pa) of at least 15 g/g.

11. A hygiene article comprising a water-absorbing polymer prepared by the process of claim 1.

12. A packaging material comprising a water-absorbing polymer prepared by the process of claim 1.

* * * * *